April 5, 1938.  M. KLEIN  2,113,482

STEAM GAUGE

Filed Nov. 14, 1932

Inventor
Maximilian Klein
By Strauch & Hoffman
Attorneys

Patented Apr. 5, 1938

2,113,482

UNITED STATES PATENT OFFICE 2,113,482

STEAM GAUGE

Maximilian Klein, Sellersville, Pa., assignor to United States Gauge Company, New York, N. Y., a corporation of Pennsylvania Application November 14, 1932, Serial No. 642,650

6 Claims. (Cl. 73—109)

This invention relates to pressure gauges of the type wherein it is necessary or desirable to employ means for preventing the internal parts, particularly the materials of the responsive element and of any fusible joints, from being subjected to high temperatures.

An example of this type of instrument is a steam gauge embodying a conventional "pigtail siphon" consisting of a looped condensate trap in the pressure line between the fluid source and the socket which carries the pressure responsive element. In such a gauge the siphon is disposed externally of the gauge case and hence not only detracts from its appearance, but also is in a position where it may suffer damage. For these reasons, and others that follow, the present invention contemplates a concealed and protected siphon for use in gauges which are connected to hot vapors.

It has previously been proposed to mount a protecting siphon pipe within the instrument casing, as illustrated in Patent Number 534,007, granted February 12th, 1895, but that proposed arrangement is open to a number of objections. Its siphon pipe is so shaped, and is related to the steam inlet and pressure responsive element in such manner, that the Bourdon tube will usually be partly filled with live steam and that hot condensate will fill the remainder of the tube. The live steam is always too hot and the condensate frequently and readily attains an undesirably high temperature. An even greater disadvantage of the proposed arrangement is that several separate fittings and mountings are required. This results in expensive manufacture, improper correlation of parts and difficulty in making repairs and adjustments. Still further proposals have been made for production of concealed siphon members, and therefore the present invention is chiefly concerned with improvements in concealed siphon structures and arrangements.

It is the primary object of the present invention to devise novel internal siphons, particularly such as may be carried by the same member that supports the pressure responsive element. More specifically, it is an object to mount a siphon, Bourdon tube and movement as an improved unit within a gauge casing, the common supporting member preferably comprising a post or socket designed for connection with the fluid source.

Another object is to devise a method of mounting a siphon tube in such manner in a conventional gauge structure that the latter is readily suitable for use either with or without the siphon, merely by making slight alterations and without addition of further parts.

The above and additional objects will fully appear from a study of the following detailed description and its appended claims, when taken in conjunction with the accompanying drawing, wherein:

Figure 1:
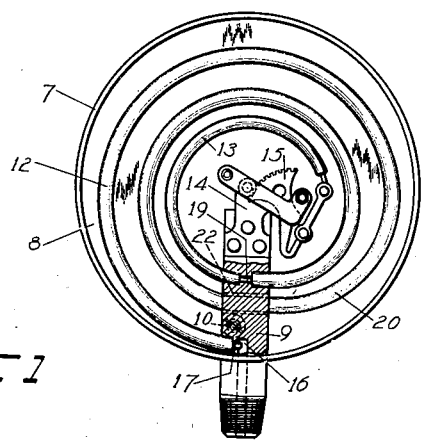
Figure 1 is a face view, in partial section, of one form of siphon member of the present invention, with the bezel, dial and pointer removed for clarity of illustration.
Figure 6:
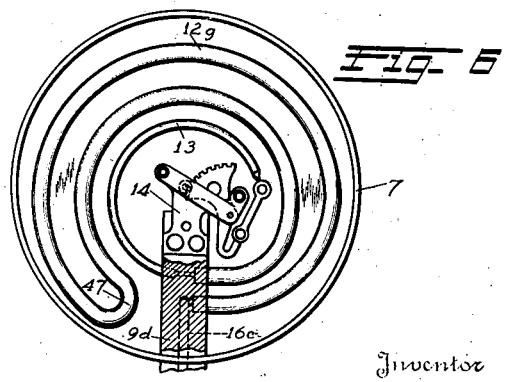

Figure 6 discloses, in a view similar to Figure 1, a further modification of the siphon tube shape and mounting.

The various illustrated siphon tubes obviously are interchangeable, with slight changes necessary in some instances, in several different types of gauge structures.

With continued reference to the drawing, wherein like characters are employed to designate like parts, and with particular reference for the moment to Figure 1:.

The instrument comprises a casing 7 having an open face and a back 8; a post or socket 9, detachably fastened to the back 8 by a screw 10, and having its lower end projecting freely through the cylindrical casing wall for connection with a fluid source; a siphon member indicated generally at 12; a Bourdon tube 13; a framework 14; and a movement, indicated generally at 15. The lower end of the Bourdon tube preferably is secured in the socket by solder, as the temperature involved in a soldering operation is relatively low, and hence will not damage the tube and permit it to later lose its constant spring characteristic.

The lower end of the socket is axially drilled to form a passage 16 which intersects a short transverse passage 17. The latter is in communication with one end of the siphon tube, which is fixed in the socket by brazing. The higher temperatures of a brazing operation are permissible at this point since a variation in the characteristics of the siphon tube material has no effect on the accuracy and life of the gauge proper. Brazed joints are desirable because they will not fuse under the temperature of the steam. The siphon tube encircles the internal gauge structure twice, that is, there are two complete convolutions forming an intermediate trap portion 20 in which the hot condensate collects, and its other end is fitted and preferably soldered into the socket in substantial alignment with the fixed end of the Bourdon tube. In order to permit the second convolution the back of the post 9 has a transverse slot or recess 22 into which the trap tube portion 20 may freely fit in rearwardly offset relation to the rest of the coiled conduit.

Member 12 is secured in fluid communication with passage 19 and the Bourdon tube at that side of socket 9 which is opposite to the side which seats the Bourdon tube. Member 12 is then bent adjacent the socket and caused to traverse the casing in a direction substantially parallel to the back 8 and passing from one side of the socket to the other adjacent the socket. A cross passage 19 interconnects the aligned tube ends. It should be understood that the soldering and brazing operations may be eliminated and the siphon and Bourdon tube ends secured to the socket by any other conventional or suitable means.

From the foregoing it will be seen that pressures are transmitted from the socket to the Bourdon tube by way of the siphon tube, and that all of the parts are supported as a unit on the socket. The movement comprises a conventional link, segment and pinion assembly associated with the framework 14, the latter being rigidly mounted on the socket by rivets, screws or the like. The common support ensures accurate relationship of parts, and reduces the material and assembling costs to a minimum. It further permits the entire operating structure, including the pointer and dial (not shown, but see Figure 2) to be inserted into and withdrawn from the casing as a unit.

When the gauge is connected to a steam line the contained air will be compressed in the Bourdon tube and hot condensate will collect in the trap formed by the trap portion 20. A certain amount of condensate may accumulate in the trap formed by the adjoined ends of the two tubes but, due to the presence of trap portion 20 and the relatively great length of the complete siphon tube, this condensate will be relatively cool and neither cause damage to the Bourdon tube material nor melt the soldered connections.

Figure 2:
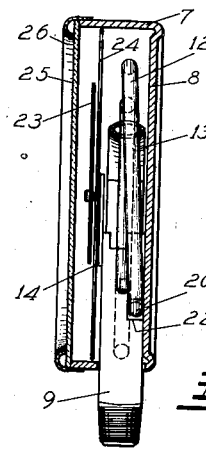
Figure 2 represents a vertical section taken centrally through the casing of Figure 1, with certain parts added and with the siphon and certain other visible internal parts shown in elevation.

As seen in Figure 2, the gauge structure of Figure 1 is completed by the addition of a pointer 23, scale 24, crystal 25 and bezel 26. Upon removal of the bezel and crystal, the entire movement, scale, Bourdon tube and siphon may be quickly withdrawn from the casing as a unit with the supporting post since all of said elements are mounted on the latter.

Any feature specifically disclosed in any one figure of the drawing, may be utilized in any of the other forms and in gauges of different design. For example, the general siphon arrangement of Figure 1 is shown carried forward into another type of gauge in Figures 3 and 4.

Figure 3:
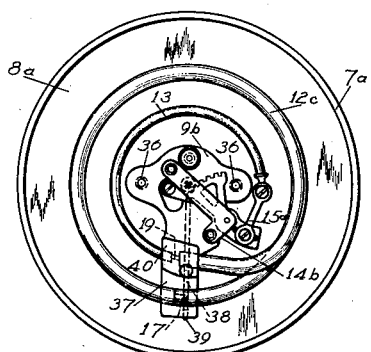
Figure 3 illustrates, in face view with parts removed, still another of the preferred embodiments of this invention, as applied to a gauge of concentric post or socket type.
Figure 4:
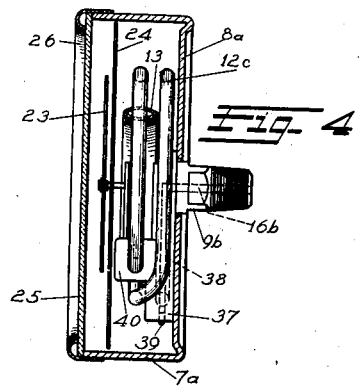
Figure 4 is a sectional view similar to Figure 2, but taken on the device of Figure 3.

The gauge of Figures 3 and 4 is designed to receive fluid from behind the casing 7a, and to this end the back wall 8a is apertured to permit the receiving end of the socket 9b to project therethrough. The body of the socket is secured to the back wall, as by screws 36, and has a downward extension 37 on which one end of the Bourdon tube is mounted and on which both ends of a siphon tube 12c are mounted. Since the movement 15a and its framework 14b likewise are carried by the socket, it will be perceived that the complete internal structure is insertable as a unit in the casing.

The socket passage 16b is intersected by a passageway 38 which is drilled upwardly through the extension 37 and closed at its lower end by a plug 39. Fluid is thus fed to one end of the siphon tube by way of these passages and the short transverse hole 17. The other end of the tube is connected with the Bourdon element by way of the passage 19 in an enlarged portion 40 of the extension 37.

The siphon tube has two complete convolutions like that of Figure 1, but arranged in tandem instead of concentrically. Obviously, one or more additional convolutions may be utilized in either case, subject only to space limitations. The tandem multi-convolution arrangement has the advantage of greater compactness due to the fact that its diameter is uniform and nowhere greater than that of the first convolution. For example, in Figure 4, the casing diameter may be considerably reduced, if desired.

Figure 5:
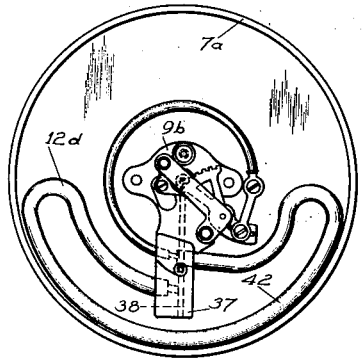
Figure 5 illustrates a further preferred form of siphon tube as applied to a gauge of the type seen in Figures 3 and 4.

Figure 5 discloses a modified form of siphon mounted in a gauge of the same type seen in Figures 3 and 4. This siphon, 12d, consists of a piece of tubing looped substantially semi-circularly to form an effective condensate trap portion 42 which passes between the socket and the lower part of the casing rim.

In a further modification shown in Figure 6, the socket 9d has an elongated passage 16c connected with one end of a siphon element 12g. Both ends are secured at the same side of the socket and are interconnected by a loop of tubing which passes around the movement and forms a hook-shaped trap 41. The sides of this hook-shaped tubing may of course be placed in tandem as well as concentrically.

Attention is especially directed to the fact that in all of the forms of the invention disclosed, the liquid trap is entirely between the two ends of the siphon passageway and does not extend into and include a portion of the Bourdon tube.

It will be further noted that, in all forms of the invention, the curved siphon passageway is disposed about an axis or axes of curvature parallel, or substantially parallel, to the axis of the cylindrical casing walls. By substantially parallel I include arrangements partaking of strict parallelism and also refer to constructions such as shown in Figure 2 where the general axis of curvature of the coil 12 is probably a few degrees out of parallelism with the cylindrical axis, but falling entirely within the spirit of the invention which provides a compact flat assembly.

This invention further contemplates the elimination of separate tubing, and the substitution of tortuous passages of any desired shape directly within the gauge socket to interconnect the fluid source with the pressure-responsive element. Such formation would not be as effective in insulating the Bourdon tube against live steam temperatures, but in many cases would be satisfactory.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:—

1. In a pressure gauge, a supporting socket provided with an internal fluid supply passage, a Bourdon tube mounted on said socket, and an elongated trap tube for protecting the Bourdon tube while transmitting fluid pressures thereto, said trap tube being bent to form two substantially parallel legs concentrically arranged outside of said Bourdon tube, the open ends of said legs approaching said socket on the same side thereof and anchored thereon, one of said ends being connected to said internal supply passage and the other to said Bourdon tube.

2. In a pressure gauge, a supporting socket provided with an internal fluid supply passage, a Bourdon tube mounted on said socket, and an elongated trap tube for protecting the Bourdon tube while transmitting fluid pressures thereto, said trap tube being bent to form two arms extending laterally in opposite directions from said socket and thence curving downwardly and joining each other below said socket, the open ends of said arms being connected into communication with said Bourdon tube and said supply passage respectively.

3. In a gauge designed for connection with vapors at relatively high temperatures, a Bourdon tube formation; a relatively thin casing having a substantially cylindrical wall surrounding said Bourdon tube formation in approximately concentric relationship; mounting means secured to said casing and designed to support said tube formation; said means carrying a device forming an elongated siphon passageway within the casing and constituting the only support on the casing for said device; said passageway being in communication at its ends with a fluid source and the Bourdon tube formation respectively, and comprising a liquid trap portion of approximately circular curvature located wholly between its own ends substantially in concentricity with said casing wall, said trap portion forming a well or pocket below said Bourdon tube formation and from which liquid is prevented from flowing under the action of gravity.

4. In a gauge designed for connection with vapors at relatively high temperatures, a Bourdon tube having a closed end; a relatively thin flat casing having a cylindrical wall substantially concentrically surrounding said tube; means secured to said casing and to said tube to support said tube; said means carrying a device in addition to said tube including a siphon passageway curved to form more than one complete loop or convolution within said casing for transmitting fluid pressures to said tube, said curved passageway being generally disposed about an axis which is substantially parallel to the axis of said cylindrical wall, so that the siphon passageway fits snugly within the confines of the flat casing.

5. In the combination defined in claim 4, there being a section of tubing forming said siphon passageway, said tubing being coiled to form a plurality of convolutions disposed entirely within said casing and concentrically surrounding said Bourdon tube.

6. In the combination defined in claim 4, there being a section of tubing forming said siphon passageway, said tubing being coiled around said Bourdon tube in tandem convolutions.

MAXIMILIAN KLEIN.